United States Patent
Li et al.

(10) Patent No.: US 11,476,021 B2
(45) Date of Patent: Oct. 18, 2022

(54) RUTHENIUM DOPED Z-TYPE HEXAFERRITE

(71) Applicant: ROGERS CORPORATION, Chandler, AZ (US)

(72) Inventors: Qifan Li, Wuhan (CN); Yajie Chen, Brighton, MA (US)

(73) Assignee: ROGERS CORPORATION, Chandler, AZ (US)

( * ) Notice: Subject to any disclaimer, the term of this patent is extended or adjusted under 35 U.S.C. 154(b) by 264 days.

(21) Appl. No.: 16/941,707

(22) Filed: Jul. 29, 2020

(65) Prior Publication Data

US 2021/0043346 A1 Feb. 11, 2021

Related U.S. Application Data

(60) Provisional application No. 62/882,681, filed on Aug. 5, 2019.

(51) Int. Cl.
| | | |
|---|---|---|
| *H01F 1/34* | (2006.01) | |
| *C01G 51/00* | (2006.01) | |
| *C08K 3/22* | (2006.01) | |
| *C04B 35/26* | (2006.01) | |
| *C01G 49/00* | (2006.01) | |
| *H01F 1/37* | (2006.01) | |

(52) U.S. Cl.
CPC ........... *H01F 1/344* (2013.01); *C01G 49/009* (2013.01); *C01G 51/66* (2013.01); *C04B 35/2633* (2013.01); *C08K 3/22* (2013.01); *H01F 1/348* (2013.01); *H01F 1/37* (2013.01); *C01P 2002/54* (2013.01); *C01P 2006/42* (2013.01); *C04B 2235/3289* (2013.01); *C04B 2235/3298* (2013.01); *C08K 2003/2289* (2013.01); *C08K 2201/01* (2013.01)

(58) Field of Classification Search
CPC ......... H01F 1/348; H01F 1/37; C01G 49/009; C04B 35/2633; C04B 2235/3298; C04B 2235/3289; C04B 2235/767

See application file for complete search history.

(56) References Cited

U.S. PATENT DOCUMENTS

| | | | |
|---|---|---|---|
| 8,758,721 B2 | 6/2014 | Hill | |
| 9,596,755 B2 | 3/2017 | Sethumadhavan et al. | |
| 10,468,169 B2 | 11/2019 | Chen et al. | |
| 2009/0266604 A1 | 10/2009 | Tetsuji | |
| 2009/0297432 A1 | 12/2009 | Hill | |
| 2013/0115160 A1 | 5/2013 | Hill et al. | |
| 2013/0342414 A1 | 12/2013 | Hong et al. | |
| 2016/0099498 A1 | 4/2016 | Pance et al. | |
| 2016/0113113 A1 | 4/2016 | Sethumadhavan et al. | |
| 2016/0276072 A1 | 9/2016 | Sethumadhavan et al. | |
| 2017/0213628 A1 | 7/2017 | Chen et al. | |
| 2018/0016157 A1 | 1/2018 | Chen et al. | |
| 2019/0013128 A1 | 1/2019 | Chen et al. | |
| 2019/0221343 A1 | 7/2019 | Chen et al. | |
| 2019/0264005 A1 | 8/2019 | Horn et al. | |
| 2021/0020343 A1 | 1/2021 | Chen et al. | |
| 2021/0032121 A1 | 2/2021 | Li et al. | |
| 2021/0065943 A1 | 3/2021 | Zhang et al. | |

FOREIGN PATENT DOCUMENTS

| | | |
|---|---|---|
| CN | 103304186 A | 9/2013 |
| CN | 104193224 A | 12/2014 |
| GB | 1105788 A | 3/1968 |
| WO | 2016064459 A2 | 4/2016 |
| WO | 2016123598 A1 | 8/2016 |

OTHER PUBLICATIONS

International Search Report; International Application No. PCT/US2020/043845; International Filing Date: Jul. 28, 2020; dated Nov. 2, 2020 ; 8 pages.
Li et al., "High-Frequency Properties and Attenuation Characteristics of WBa Hexaferrite Composites with Doping of Varius Oxides," Transactions of Magnetics, Feb. 2009, pp. 670-677, vol. 45 No. 2.
Park et al. "Design of Wide bandwidth microwave absorber with Ferrite composites of broad magenetic loss specturm," Advanced Materials Engineering, 2015.
Singh et al. "Static Magentic Properties of Co and Ru substituted Ba—Sr ferrite," 2008, Materials Research Bulletin, pp. 176-184, vol. 43.
Written Opinion; International Application No. PCT/US2020/043845; International Filing Date: Jul. 28, 2020; dated Nov. 2, 2020 ; 8 pages.
Brando et al., "Microwave Electromagnetic Characteristics of New Substituted M-Hexaferrites BaFe12–2xAxMexO19 (A=Ru, Ir ; Me=Co, Zn)", Journal De Physique IV France, Mar. 1997.
Jaejin Lee et al: "Role of Small Permeability in Gigahertz Ferrite Antenna Performance", IEEE Magnetics Letters, col. 2, Jan. 1, 2013, pp. 5000104-5000104, XP055241013, USA.
Lee et al. "Figure of merit of X-type hexaferrite (Ba2Co2Fe28O46) for mobile antenna applications", Microwave and Optical Technology Letters, vol. 60, Issue 3, Feb. 5, 2018, https://doi.org/10.1002/mop.31053.
Li et al. "High-frequency magnetic properties of W-type barium-ferrite BaZn2–xCoxFe16O27 composites", Journal of Applied Physics 94, 5918 (2003): https://doi.org/10.1063/1.1618945.
Martin et al.; "Flexible Magnetic Composites"; Passive RF Component Technoloby, Materials Techniques and Applications; Chapter 8; 2012; pp. 156-185.

*Primary Examiner* — C Melissa Koslow
(74) *Attorney, Agent, or Firm* — Cantor Colburn LLP

(57) ABSTRACT

In an aspect, a ferrite composition comprises a Ru—Co$_2$Z ferrite having the formula: $(Ba_{3-x}M_x)Co_2(M'Ru)_yFe_{24-2y-z}O_{41}$, wherein M is at least one of Sr, Pb, or Ca; M' is at least one of Co, Zn, Mg, or Cu; x is 1 to 3; y is greater than 0 to 2; and z is −4 to 4. In another aspect, an article comprises the ferrite composition. In yet another aspect, method of making the ferrite composition comprises mixing ferrite precursor compounds comprising Fe, Ba, Co, and Ru; and sintering the ferrite precursor compounds in an oxygen atmosphere to form the Ru—Co$_2$Z ferrite.

20 Claims, 3 Drawing Sheets

RUTHENIUM DOPED Z-TYPE HEXAFERRITE

CROSS-REFERENCE TO RELATED APPLICATION

This application claims the benefit of U.S. Provisional Patent Application Ser. No. 62/882,681 filed Aug. 5, 2019. The related application is incorporated herein in its entirety by reference.

BACKGROUND

Improved performance and miniaturization are needed to meet the ever-increasing demands of devices used in ultra-high frequency (UHF), L-band, and S-band applications, which are of particular interest in a variety of commercial and defense related industries. As an important component in radar and modern wireless communication systems, antenna elements with compact size are constantly being developed. It has, however, been challenging to develop ferrite materials for use in such high frequency applications as most ferrite materials exhibit relatively high magnetic loss at high frequencies. In general, hexagonal ferrites, or hexaferrites, are a type of iron-oxide ceramic compound that has a hexagonal crystal structure and exhibits magnetic properties. Several types of families of hexaferrites are known, including Z-type ferrites, $Ba_3Me_2Fe_{24}O_{41}$, and Y-type ferrites, $Ba_2Me_2Fe_{12}O_{22}$, where Me can be a small 2+ cation such as Co, Ni, or Zn and Sr can be substituted for Ba. Other hexaferrite types include M-type ferrites ($(Ba,Sr)Fe_{12}O_{19}$), W-type ferrites ($(Ba,Sr)Me_2Fe_{16}O_{27}$), X-type ferrites ($(Ba,Sr)_2Me_2Fe_{28}O_{46}$), and U-type ferrites ($(Ba,Sr)_4Me_2Fe_{36}O_{60}$).

Some hexaferrites, such as cobalt-substituted barium Y-type ($Co_2Y$) and Z-type ($Co_2Z$) hexaferrites, can have much higher ferromagnetic resonance frequencies and permeabilities as compared to spinel ferrites, making them attractive in high frequency applications. Despite these improvements though, their use in high frequency and microwave devices is limited as these substitutions also result in an increase in the magnetic loss. While Z-type ferrites are a candidate for high impedance magneto-dielectric composites, the high magnetic loss limits their use. Improved Z-type ferrites are therefore desired.

BRIEF SUMMARY

Disclosed herein is ruthenium doped z-type hexaferrite.

In an aspect, a ferrite composition comprises a $Ru-Co_2Z$ ferrite having the formula: $(Ba_{3-x}M_x)CO_2(M'Ru)_yFe_{24-2y-z}O_{41}$, wherein M is at least one of Sr, Pb, or Ca; M' is at least one of Co, Zn, Mg, or Cu; x is 1 to 3; y is greater than 0 to 2; and z is −4 to 4.

In another aspect, an article comprises at least one of the ferrite composition or a ferrite composite.

In yet another aspect, method of making the ferrite composition comprises mixing ferrite precursor compounds comprising Fe, Ba, Co, Ru, M, and M'; and sintering the ferrite precursor compounds in an oxygen atmosphere to form the $Ru-Co_2Z$ ferrite.

The above described and other features are exemplified by the following figures, detailed description, and claims.

BRIEF DESCRIPTION OF THE DRAWINGS

The following figures are exemplary embodiments, which are provided to illustrate the present disclosure. The figures are illustrative of the examples, which are not intended to limit devices made in accordance with the disclosure to the materials, conditions, or process parameters set forth herein.

DETAILED DESCRIPTION

Figure 1:
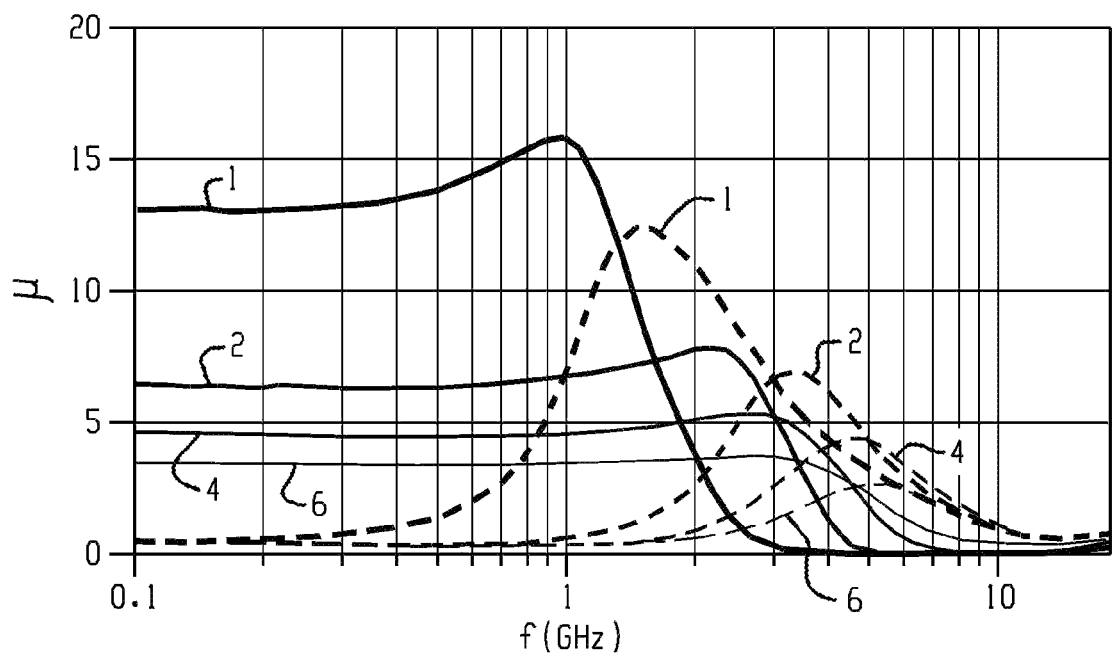
FIG. 1 is a graphical illustration of the permeability and magnetic loss tangent with frequency for Examples 1, 2, 4, and 6.

It was discovered that substituting at least a portion of the iron ion in a Z-type hexaferrite with ruthenium can result in a $Ru-Co_2Z$ ferrite with improved properties. Specifically, the $Ru-Co_2Z$ ferrite can have the general formula:

$$(Ba_{3-x}M_x)Co_2(M'Ru)_yFe_{24-2y-z}O_{41}$$

wherein M is at least one of Sr, Pb, or Ca; M' is at least one of Co, Zn, Mg, or Cu; x is 1 to 3; y is greater than 0 to 2, or 0.001 to 2; and z is −4 to 4. M' can be Co. A ratio of Ru to M' can be 0.01 to 3 or 0.01 to 1. The variable z can be modified as non-zero to include non-stoichiometric formulations.

The $Ru-Co_2Z$ ferrite can have a planar easy magnetization (c-plane). The $Ru-Co_2Z$ ferrite can have at least one of a high permeability, high operating frequency, or a low magnetic loss, making it suitable for use as an antenna or an inductor at S-L band frequency. The $Ru-Co_2Z$ ferrite can have a permeability of greater than or equal to 3.5, or greater than or equal to 5, or 5 to 10 at a frequency of 1 to 2 gigahertz, or at 2 to 4 gigahertz in the form of a solid ceramic. The $Ru-Co_2Z$ ferrite can have a magnetic loss tangent $\tan \delta_\mu$ of less than or equal to 0.4, less than or equal to 0.2, or less than or equal to 0.1 or less than or equal to 0.08, or 0.04 to 0.4 at a frequency of 1 to 2 gigahertz in the form of a solid ceramic. The $Ru-Co_2Z$ ferrite can have a permittivity of 6 to 15, or 6 to 12, or 10 to 14 at a frequency of 1 to 2 gigahertz in the form of a solid ceramic. The $Ru-Co_2Z$ ferrite can have a dielectric loss tangent $\tan \delta_\varepsilon$ of less than or equal to 0.15, less than or equal to 0.009, or less than or equal to 0.008, or 0.002, or 0.001 to 0.15 at a frequency of 1 to 2 gigahertz in the form of a solid ceramic. The $Ru-Co_2Z$ ferrite can have an operating frequency of 0.1 to 4 gigahertz, or 0.5 to 2 gigahertz, or 1 to 2 gigahertz, in the form of a solid ceramic.

The $Ru-Co_2Z$ ferrite can have at least one of a low dielectric loss tangent $\tan \delta_\varepsilon$ or a magnetic loss tangent $\tan \delta_\mu$ within the ultrahigh frequency range. For example, the $Ru-Co_2Z$ ferrite can have at least one of a dielectric loss tangent $\tan \delta_\varepsilon$ of less than or equal to 0.01, or less than or equal to 0.008, or 0.006 to 0.01 or a magnetic loss tangent $\tan \delta_\mu$ of less than or equal to 0.12, or less than or equal to 0.08, or 0.05 to 0.12 at a frequency of 1 to 2 gigahertz, in the form of a solid ceramic.

As used herein, magnetic and dielectric properties are measured in coaxial airline by vector network analyzer (VNA) using the Nicholson-Ross-Weir (NRW) method and the permeability and permittivity values are the relative permeability and the relative permittivity, respectively.

The Ru—Co$_2$Z ferrite can be prepared using any suitable method. Generally, the Ru—Co$_2$Z ferrite can be formed by first forming a mixture comprising the precursor compounds including oxides of at least Ba, M, Co, Ru, and Fe wherein M is at least one of Sr, Pb, or Ca. For example, the mixture can comprise at least $BaCO_3$, $MCO_3$, $Co_3O_4$, $RuO_2$, and $Fe_2O_3$. The mixture can comprise 5 to 20 weight percent of $BaCO_3$ based on the total weight of the mixture. The mixture can comprise 5 to 20 weight percent of $MCO_3$ based on the total weight of the mixture. The mixture can comprise 2 to 15 weight percent of $Co_3O_4$ based on the total weight of the mixture. The mixture can comprise 0.1 to 10 weight percent of $RuO_2$ based on the total weight of the mixture. The mixture can comprise 50 to 80 weight percent of $Fe_2O_3$ based on the total weight of the mixture. The mixture can further comprise an oxide of at least one of Zn, Mg, or Cu. It is noted that the weight percentages of the mixture can be based on the total weight of the oxides in the mixture The mixture can be calcined in air to form a ferrite comprising a Z-type ferrite. The calcining can occur at a calcination temperature of 800 to 1,300 degrees Celsius (° C.). The calcining can occur for a calcination time of 0.5 to 20 hours, 1 to 10 hours, or 2 to 5 hours. It is noted that the calcination step is optional, and the only heating step can be the sintering to form the ferrite.

The ferrite can be crushed and optionally sieved to form particulates. The sieving can comprise sieving through a number 10 to 100 mesh screen. Coarse particles can be further ground to reduce the particle size. The particulates can have a median D50 particle size by volume of 0.5 to 50 micrometers, or 0.5 to 10 micrometers. The particle size can be determined using Horiba LA-910 laser light scattering PSD analyzer or as determined in accordance with ASTM D4464-15. The ferrite can be mixed with a binder. The binder can comprise at least one of poly(vinyl alcohol), methyl cellulose, poly(vinyl butyral), poly(ethylene glycol), or poly(alkylene carbonate). The binder can be present in an amount of 8 to 12 weight percent based on the total amount of the ferrite plus the binder. The binder can facilitate shaping of the ferrite and can fully burn off during sintering. The bound ferrite can have a median D50 particle size by volume of 10 to 300 micrometers, or 50 to 300 micrometers.

The ferrite can be optionally shaped and sintered to form the Ru—Co$_2$Z ferrite. The method of shaping is not limited and can comprise at least one of uniaxial compression, isostatic pressing, casting, pressing, or the like. The pressing can occur at a pressure of 0.5 to 2 metric tons per centimeter squared. The sintering can occur at a sintering temperature of 1,000 to 1,300° C., or 1,200 to 1,250° C. The ramping temperature up to and down from the sintering temperature can each independently occur at a ramp rate of 1 to 5° C. per minute. The sintering can occur for a sintering time of 1 to 20 hours, or 5 to 12 hours. The sintering can be performed in an oxygen environment to help reduce the dielectric loss. Oxygen can be introduced to the sintering chamber at a flow rate of 0.1 to 10 liters per minute. The sintered Ru—Co$_2$Z ferrite can be finished in any desired manner, for example, by cutting or polishing, depending on the application.

Prior to the sintering, an amount of bismuth oxide can be added to the ferrite. The bismuth oxide can be added in an amount of 0.2 to 5 weight percent based on the total weight of the ferrite. The addition of $Bi_2O_3$, which can be present at grain boundaries of the Z-type ferrite phase, can aid in achieving a composition that has equal or substantially equal values of permeability and permittivity while retaining low magnetic and dielectric loss tangents.

The Ru—Co$_2$Z ferrite can have an average grain size of 1 to 100 micrometers, or 5 to 50 micrometers. The grain size can be measured using at least one of transmission electron microscopy, field emission scanning electron microscopy, or x-ray diffraction.

The Ru—Co$_2$Z ferrite can be a bulk ceramic or can be present in a composite, for example, comprising the Ru—Co$_2$Z ferrite and a polymer. The polymer can comprise a thermoplastic or a thermoset. As used herein, the term "thermoplastic" refers to a material that is plastic or deformable, melts to a liquid when heated, and freezes to a brittle, glassy state when cooled sufficiently. Examples of thermoplastic polymers that can be used include cyclic olefin polymers (including polynorbornenes and copolymers containing norbornenyl units, for example, copolymers of a cyclic polymer such as norbornene and an acyclic olefin such as ethylene or propylene), fluoropolymers (for example, polyvinyl fluoride (PVF), polyvinylidene fluoride (PVDF), fluorinated ethylene-propylene (FEP), polytetrafluoroethylene (PTFE), poly(ethylene-tetrafluoroethylene (PETFE), or perfluoroalkoxy (PFA)), polyacetals (for example, polyoxyethylene and polyoxymethylene), poly($C_{1-6}$ alkyl)acrylates, polyacrylamides (including unsubstituted and mono-N— or di-N—($C_{1-8}$ alkyl)acrylamides), polyacrylonitriles, polyamides (for example, aliphatic polyamides, polyphthalamides, or polyaramides), polyamideimides, polyanhydrides, polyarylene ethers (for example, polyphenylene ethers), polyarylene ether ketones (for example, polyether ether ketones (PEEK) and polyether ketone ketones (PEKK)), polyarylene ketones, polyarylene sulfides (for example, polyphenylene sulfides (PPS)), polyarylene sulfones (for example, polyethersulfones (PES), polyphenylene sulfones (PPS), and the like), polybenzothiazoles, polybenzoxazoles, polybenzimidazoles, polycarbonates (including homopolycarbonates or polycarbonate copolymers such as polycarbonate-siloxanes, polycarbonate-esters, or polycarbonate-ester-siloxanes), polyesters (for example, polyethylene terephthalates, polybutylene terephthalates, polyarylates, or polyester copolymers such as polyesterethers), polyetherimides (for example, copolymers such as polyetherimide-siloxane copolymers), polyimides (for example, copolymers such as polyimide-siloxane copolymers), poly($C_{1-6}$ alkyl)methacrylates, polyalkylacrylamides (for example, unsubstituted and mono-N— or di-N—($C_{1-8}$ alkyl)acrylamides), polyolefins (for example, polyethylenes, such as high density polyethylene (HDPE), low density polyethylene (LDPE), and linear low density polyethylene (LLDPE), polypropylenes, and their halogenated derivatives (such as polytetrafluoroethylenes), and their copolymers, for example, ethylene-alpha-olefin copolymers), polyoxadiazoles, polyoxymethylenes, polyphthalides, polysilazanes, polysiloxanes (silicones), polystyrenes (for example, copolymers such as acrylonitrile-butadiene-styrene (ABS) or methyl methacrylate-butadiene-styrene (MBS)), polysulfides, polysulfonamides, polysulfonates, polysulfones, polythioesters, polytriazines, polyureas, polyurethanes, vinyl polymers (for example, polyvinyl alcohols, polyvinyl esters, polyvinyl ethers, polyvinyl halides (for example, polyvinyl chloride), polyvinyl ketones, polyvinyl nitriles, or polyvinyl thioethers), a paraffin wax, or the like. A combination comprising at least one of the foregoing thermoplastic polymers can be used.

Thermoset polymers are derived from thermosetting monomers or prepolymers (resins) that can irreversibly harden and become insoluble with polymerization or cure, which can be induced by heat or exposure to radiation (e.g., ultraviolet light, visible light, infrared light, or electron beam (e-beam) radiation). Thermoset polymers include alkyds, bismaleimide polymers, bismaleimide triazine polymers, cyanate ester polymers, benzocyclobutene polymers, benzoxazine polymers, diallyl phthalate polymers, epoxies, hydroxymethylfuran polymers, melamine-formaldehyde polymers, phenolics (including phenol-formaldehyde polymers such as novolacs and resoles), benzoxazines, polydienes such as polybutadienes (including homopolymers and copolymers thereof, e.g. poly(butadiene-isoprene)), polyisocyanates, polyureas, polyurethanes, triallyl cyanurate polymers, triallyl isocyanurate polymers, certain silicones, and polymerizable prepolymers (e.g., prepolymers having ethylenic unsaturation, such as unsaturated polyesters, polyimides), or the like. The prepolymers can be polymerized, copolymerized, or crosslinked, e.g., with a reactive monomer such as styrene, alpha-methylstyrene, vinyltoluene, chlorostyrene, acrylic acid, (meth)acrylic acid, a ($C_{1-6}$ alkyl) acrylate, a ($C_{1-6}$ alkyl) methacrylate, acrylonitrile, vinyl acetate, allyl acetate, triallyl cyanurate, triallyl isocyanurate, or acrylamide.

Methods of forming the composite are not limited and can comprise injection molding, reaction injection molding, laminating, extruding, compression molding, calendering, casting, and the like. The composite can be free of a void space.

An article can comprise the Ru—$Co_2$Z ferrite. The article can be an antenna or an inductor core. The article can be for use in the frequency 0.1 to 4 gigahertz range, or in the 0.5 to 2 gigahertz range. The article can be used for a variety of devices operable within the ultrahigh frequency range, such as a high frequency or microwave antenna, filter, inductor, circulator, or phase shifter. The article can be operable at frequencies greater than or equal to 0.1 GHz, or at frequencies greater than or equal to 0.3 GHz. Such articles can be used in commercial and military applications, weather radar, scientific communications, wireless communications, autonomous vehicles, aircraft communications, space communications, satellite communications, or surveillance.

As is disclosed herein, a ferrite composition can comprise a Ru—$Co_2$Z ferrite having the formula: $(Ba_{3-x}M_x)CO_2(M'Ru)_yFe_{24-2y-z}O_{41}$, wherein M is at least one of Sr, Pb, or Ca; M' is at least one of Co, Zn, Mg, or Cu; x is 1 to 3; y is greater than 0 to 2, or 0.001 to 2; and z is −4 to 4. M' can be at least Co. A ratio of Ru to M' can be 0.01 to 3. The ferrite composition can further comprise $Bi_2O_3$ in an amount of 0.2 to 5.0 weight percent based on the total weight of the ferrite composition. The ferrite composition can have a permeability of greater than or equal to 3.5 at a frequency of 1 to 2 gigahertz in the form of a solid ceramic. The ferrite composition can have a permittivity of 6 to 15 at a frequency of 1 to 2 gigahertz in the form of a solid ceramic. The ferrite composition can have a magnetic loss tangent tan $\delta_\mu$ of less than or equal to 0.12, or less than or equal to 0.08 at a frequency of 1 to 2 gigahertz in the form of a solid ceramic. The ferrite composition can have a dielectric loss tangent tan $\delta_\epsilon$ of less than or equal to 0.01, or less than or equal to 0.008 at a frequency of 1 to 2 gigahertz in the form of a solid ceramic. A composite can comprise the ferrite composition and a polymer. An article can comprise the ferrite composition or the composite. The article can be an antenna, filter, inductor, circulator, or phase shifter. The article can be a microwave antenna. The antenna can be operable at a frequency of greater than or equal to 0.1 gigahertz, or greater than or equal to 0.3 gigahertz, or 0.1 to 4 gigahertz.

A method of making the ferrite composition can comprise mixing ferrite precursor compounds comprising Fe, Ba, Co, Ru, M, and M'; and sintering the ferrite precursor compounds in an oxygen atmosphere to form the Ru—$Co_2$Z ferrite. The ferrite precursor compounds can comprise $BaCO_3$, $MCO_3$, $Co_3O_4$, $RuO_2$, and $Fe_2O_3$, wherein M is at least one of Sr, Pb, or Ca, and wherein M' is at least one of Co, Zn, Mg, or Cu. The ferrite precursor compounds can comprise 5 to 20 weight percent of $BaCO_3$, 5 to 20 weight percent of $MCO_3$, 2 to 15 weight percent of $Co_3O_4$, 0.1 to 10 weight percent of $RuO_2$, and 50 to 80 weight percent of $Fe_2O_3$; all based on the total weight of the mixture. The sintering can occur at a sintering temperature of 1,000 to 1,300° C., or 1,200 to 1,250° C. for a sintering time of 1 to 20 hours, or 5 to 12 hours. The method can further comprise calcining the ferrite precursor compounds in air prior to the sintering. The method can further comprise mixing the ferrite precursor compounds with a binder prior to the sintering. The method can further comprise forming the ferrite precursor compounds prior to the sintering.

The following examples are provided to illustrate the present disclosure. The examples are merely illustrative and are not intended to limit devices made in accordance with the disclosure to the materials, conditions, or process parameters set forth therein.

EXAMPLES

In the examples, the magnetic permeability of the resulting ferrite samples was measured in coaxial airline by vector network analyzer (VNA) using the Nicholson-Ross-Weir (NRW) method over a frequency of 0.1 to 10 GHz.

Examples 1-8

Preparation of Ru—$Co_2$Z Ferrite Samples

Ru—$Co_2$Z ferrite samples were formed varying the amount of ruthenium, y, in the general formula $(Ba_{1.5}Sr_{1.5})Co_2(CoRu)_yFe_{22.4-2y}O_{41}$, to form ferrite compositions as shown in Table 1. The Ru—$Co_2$Z ferrites were prepared by mixing appropriate amounts of $BaCO_3$, $SrCO_3$, $Co_3O_4$, $Fe_2O_3$, and $RuO_2$ were indicated in a wet planetary mill to form a mixture. The mixture was calcined to a calcination temperature of 1,200° C. for a soak time of 4 hours in air to form a ferrite. The ferrite was crushed and sieved through a 40 mesh screen. The coarse particles were ground to form particulates having a median D50 particle size by volume of 0.5 to 10 micrometers in a wet planetary mill. A granulate mixture was formed by mixing the particulates with 0.5 to 5 weight percent of poly(vinyl alcohol) based the total amount of the granulate mixture. The granulate mixture was then compressed to form toroid granules having an outer diameter of 7 millimeters, an inner diameter of 3 millimeters, and a thickness of 3 to 3.5 millimeter at a pressure of 1 metric tons per centimeter squared. The toroid granules were sintered at a sintering temperature of 1,200° C., 1,220° C., or 1,240° C. for 10 hours in atmosphere of oxygen by flowing oxygen gas at a rate of 0.5 liters per minute, using a ramp rate: 3° C. per minute and a cooling rate of −3° C. per minute.

TABLE 1

| y | Formula |
|---|---|
| 0 | $Ba_{1.5}Sr_{1.5}Co_2Fe_{22.4}O_{41}$ |
| 0.1 | $Ba_{1.5}Sr_{1.5}Co_{2.1}Ru_{0.1}Fe_{22.2}O_{41}$ |
| 0.2 | $Ba_{1.5}Sr_{1.5}Co_{2.2}Ru_{0.2}Fe_{22}O_{41}$ |
| 0.3 | $Ba_{1.5}Sr_{1.5}Co_{2.3}Ru_{0.3}Fe_{21.8}O_{41}$ |

Figure 2:
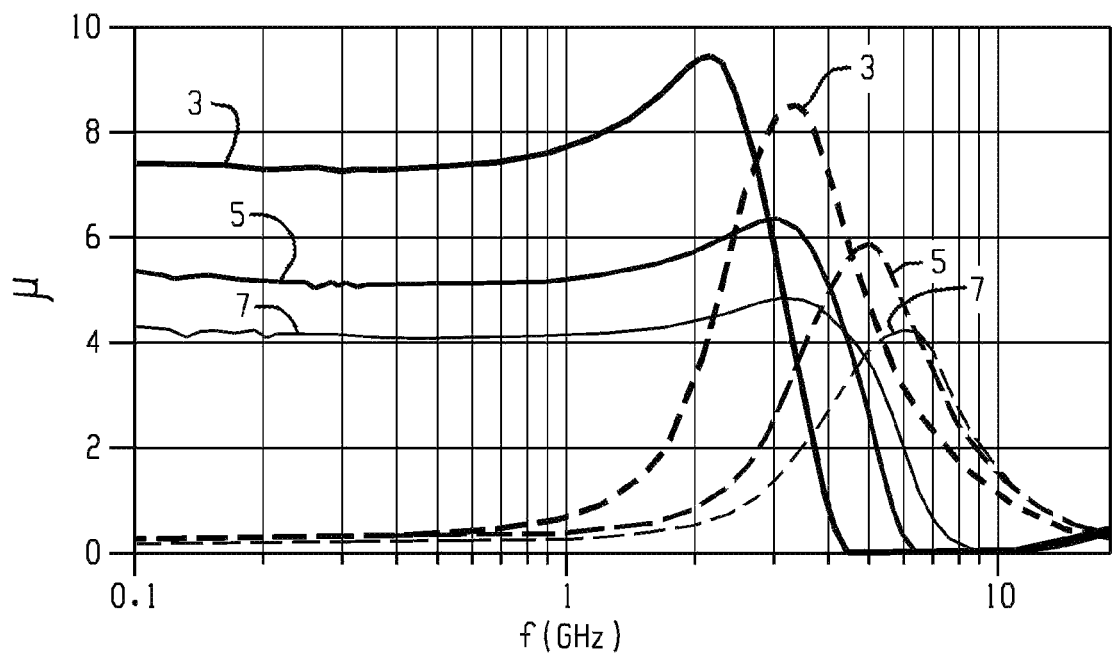
FIG. 2 is a graphical illustration of the permeability and magnetic loss tangent with frequency for Examples 3, 5, and 7.
Figure 3:
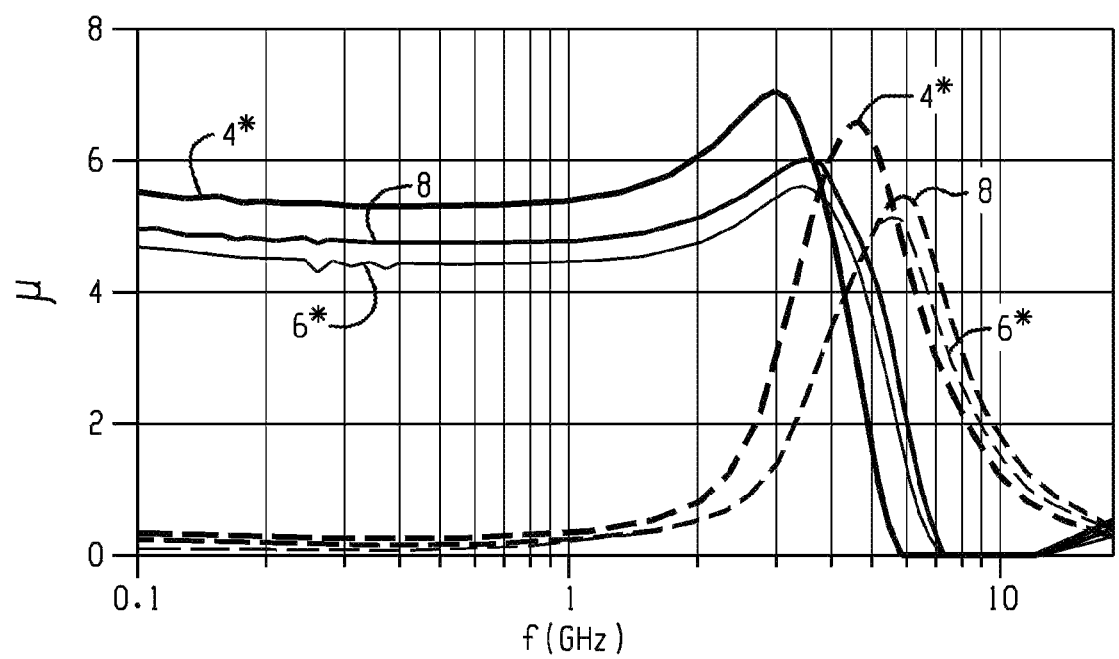
FIG. 3 is a graphical illustration of the permeability and magnetic loss tangent with frequency for Examples 4, 6, and 8.
Figure 4:
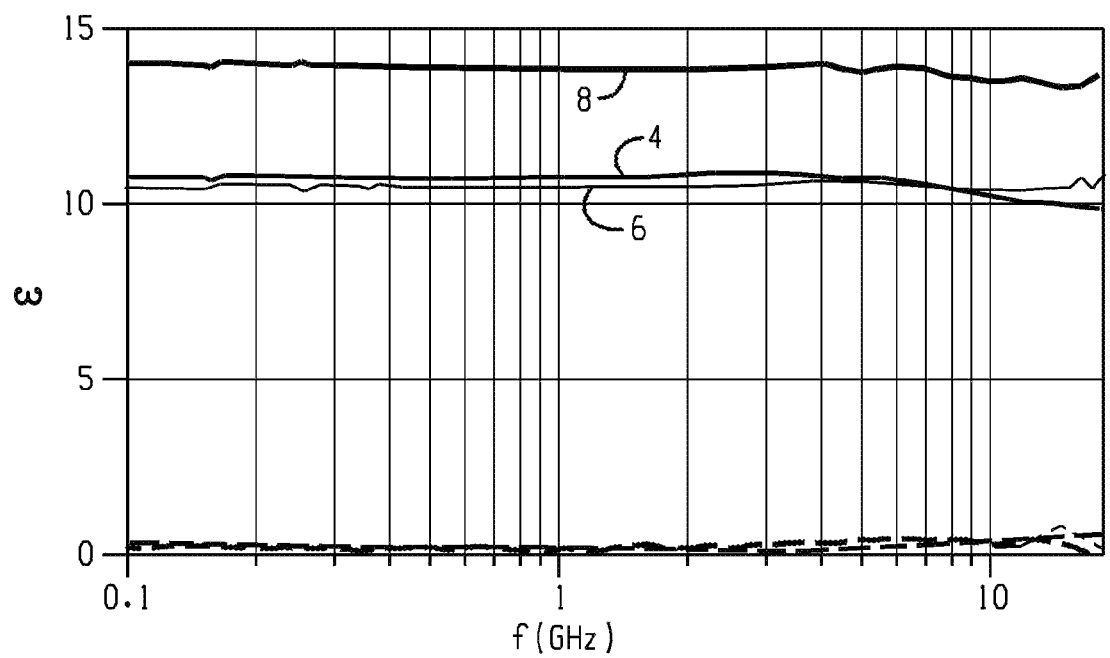
FIG. 4 is a graphical illustration of the permittivity and dielectric loss tangent with frequency for Examples 4, 6, and 8.

Various ferrite compositions were prepared, where the sintering temperatures and the y values are shown in Tables 2 and 3. The permeability (solid lines) and the magnetic loss tangent (dashed lines) are shown in FIG. 1, FIG. 2, and FIG. 3 as a function of frequency and specific values of the different compositions are shown in Table 2. It is noted that in FIG. 3, samples with the asterisk are repeat samples. The permittivity (solid lines) and the dielectric loss tangent (dashed lines) of several of the samples are shown in FIG. 4 as a function of frequency, and specific values of the different compositions are shown in Table 3.

TABLE 2

| | Ferrite Sample | | | | | | | |
|---|---|---|---|---|---|---|---|---|
| | 1 | 2 | 3 | 4 | 5 | 6 | 7 | 8 |
| y | 0 | 0.1 | 0.1 | 0.2 | 0.2 | 0.3 | 0.3 | 0.3 |
| Sintering temperature (° C.) | 1,200 | 1,200 | 1,220 | 1,200 | 1,220 | 1,200 | 1,220 | 1,240 |
| μ' at 1 GHz | 15.6 | 6.7 | 7.7 | 4.6 | 5.4 | 3.5 | 4.1 | 4.8 |
| μ' at 1.6 GHz | 7.2 | 7.4 | 8.6 | 4.9 | 5.8 | 3.6 | 4.3 | 4.9 |
| μ' at 2 GHz | 3.4 | 7.7 | 9.3 | 5.1 | 6.1 | 3.6 | 4.4 | 5.1 |
| μ' at 3 GHz | — | — | 6.0 | — | 7.1 | — | 4.8 | 5.8 |
| $tan\delta_\mu$ at 1 GHz | 0.380 | 0.099 | 0.094 | 0.068 | 0.065 | 0.066 | 0.067 | 0.061 |
| $tan\delta_\mu$ at 1.6 GHz | 0.240 | 0.210 | 0.201 | 0.121 | 0.102 | 0.132 | 0.102 | 0.087 |
| $tan\delta_\mu$ at 2 GHz | 3.171 | 0.352 | 0.355 | 0.187 | 0.141 | 0.189 | 0.134 | 0.112 |
| $tan\delta_\mu$ at 3 GHz | — | — | 1.370 | — | 0.415 | — | 0.291 | 0.242 |

The results show that increasing the amount of ruthenium results in a significant decrease in the magnetic loss tangent, while still maintaining a permeability, μ', of greater than or equal to 3 from 1 to 2 gigahertz. The results also show that merely by increasing the sintering temperature the permeability can be increased while further decreasing the magnetic loss tangent.

TABLE 3

| | Ferrite Sample | | |
|---|---|---|---|
| | 4 | 6 | 8 |
| y | 0.2 | 0.3 | 0.3 |
| Sintering temperature (° C.) | 1,200 | 1,200 | 1,240 |
| ε' at 1 GHz | 10.8 | 10.5 | 13.8 |
| ε' at 1.6 GHz | 10.8 | 10.5 | 13.8 |
| ε' at 2 GHz | 10.8 | 10.5 | 13.9 |
| ε' at 3 GHz | 10.9 | 10.6 | 13.9 |
| $tan\delta_\epsilon$ at 1 GHz | 0.005 | 0.004 | 0.009 |
| $tan\delta_\epsilon$ at 1.6 GHz | 0.006 | 0.006 | 0.008 |
| $tan\delta_\epsilon$ at 2 GHz | 0.005 | 0.006 | 0.008 |
| $tan\delta_\epsilon$ at 3 GHz | 0.008 | 0.008 | 0.010 |

Table 3 and FIG. 4 show that increasing the sintering temperature can result in an increase in the permittivity while maintaining low dielectric tangent values.

Examples 9-10

Preparation of Ru—Co$_2$Z Ferrite Samples Using a 1-Step Sintering Process

Ru—Co$_2$Z ferrite samples were formed varying the amount of ruthenium, y, in the general formula $(Ba_{1.5}Sr_{1.5})Co_2(CoRu)_yFe_{22.4-2y}O_{41}$, to form ferrite compositions as shown in Table 1. The Ru—Co$_2$Z ferrites were prepared by mixing appropriate amounts of $BaCO_3$, $SrCO_3$, $Co_3O_4$, $RuO_2$, and $Fe_2O_3$ in a wet planetary mill to form a mixture. The mixture was formed by mixing the particulates with 0.5 to 5 weight percent of poly(vinyl alcohol) based the total amount of the mixture. The mixture was then compressed to form toroid granules having an outer diameter of 7 millimeters, an inner diameter of 3 millimeters, and a thickness of 3 to 3.5 millimeter at a pressure of 1 metric ton per centimeter squared. The toroid granules were sintered at a sintering temperature of 1,220° C. or 1,240° C. for 10 hours in an atmosphere of oxygen by flowing oxygen gas at a rate of 0.5 liters per minute, using a ramp rate: 3° C. per minute and a cooling rate of −3° C. per minute.

Figure 5:
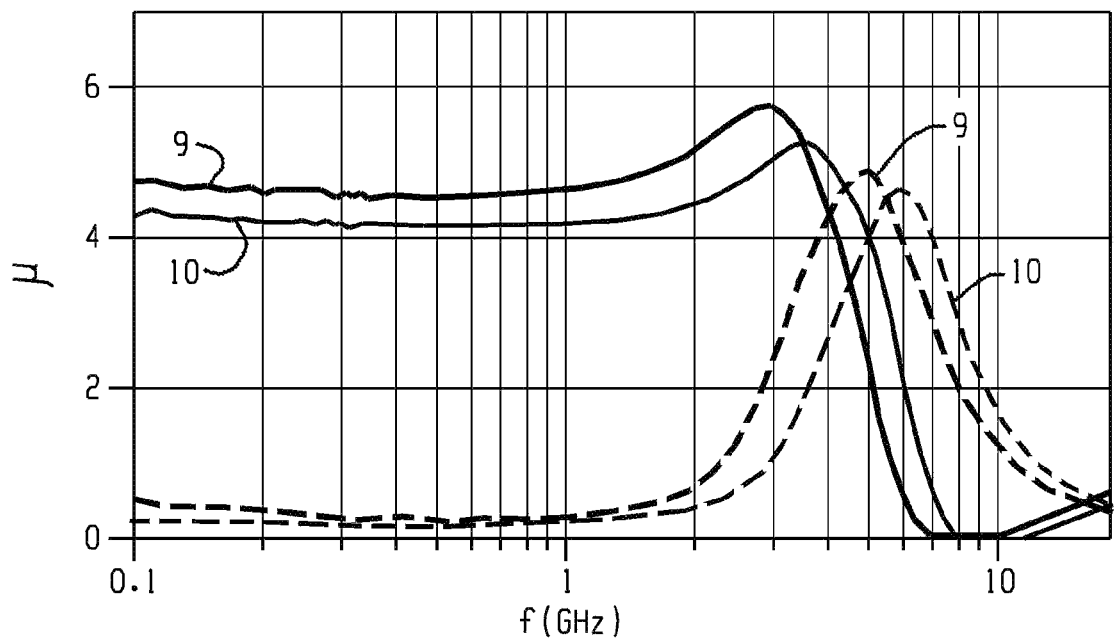
FIG. 5 is a graphical illustration of the permeability and magnetic loss tangent with frequency for Examples 9 and 10.
Figure 6:
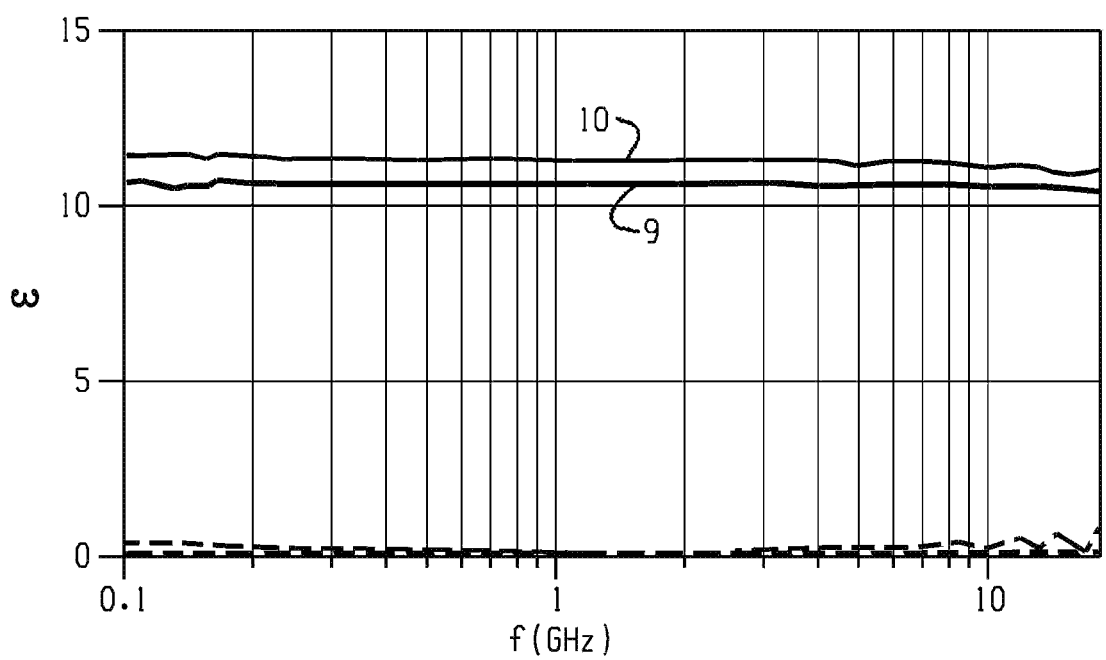
FIG. 6 is a graphical illustration of the permittivity and dielectric loss tangent with frequency for Examples 9 and 10.

Various ferrite compositions were prepared, where the sintering temperatures and the y values are shown in Table 4 and Table 5. The permeability (solid lines) and the magnetic loss tangent (dashed lines) are shown in FIG. 5 as a function of frequency and specific values of the different compositions are shown in Table 4. The permittivity (solid lines) and the dielectric loss tangent (dashed lines) of several of the samples are shown in FIG. 6 as a function of frequency, and specific values of the different compositions are shown in Table 5.

TABLE 4

| | Ferrite Sample | |
|---|---|---|
| | 9 | 10 |
| y | 0.2 | 0.3 |
| Sintering temperature (° C.) | 1,200 | 1,240 |
| μ' at 1 GHz | 4.6 | 4.2 |
| μ' at 1.6 GHz | 4.9 | 4.3 |
| μ' at 2 GHz | 5.2 | 4.5 |
| μ' at 3 GHz | 5.7 | 5.0 |
| $tan\delta_\mu$ at 1 GHz | 0.061 | 0.057 |
| $tan\delta_\mu$ at 1.6 GHz | 0.096 | 0.079 |
| $tan\delta_\mu$ at 2 GHz | 0.135 | 0.101 |
| $tan\delta_\mu$ at 3 GHz | 0.404 | 0.215 |

TABLE 5

| | Ferrite Sample | |
| --- | --- | --- |
| | 9 | 10 |
| y | 0.2 | 0.3 |
| Sintering temperature (° C.) | 1,200 | 1,240 |
| $\epsilon'$ at 1 GHz | 4.6 | 4.2 |
| $\epsilon'$ at 1.6 GHz | 4.9 | 4.3 |
| $\epsilon'$ at 2 GHz | 5.2 | 4.5 |
| $\epsilon'$ at 3 GHz | 5.7 | 5.0 |
| $\tan\delta_\epsilon$ at 1 GHz | 0.061 | 0.057 |
| $\tan\delta_\epsilon$ at 1.6 GHz | 0.096 | 0.079 |
| $\tan\delta_\epsilon$ at 2 GHz | 0.135 | 0.101 |
| $\tan\delta_\epsilon$ at 3 GHz | 0.404 | 0.215 |

The results show that good permeability and magnetic loss tangent values are maintained using a 1-step sintering process.

Examples 11-14

Preparation of Composites Comprising the Ferrite Composition

Ru—$Co_2$Z ferrite samples were formed varying the amount of ruthenium, y, in the general formula $(Ba_{1.5}Sr_{1.5})Co_2(CoRu)_yFe_{22.4-2y}O_{41}$, to form ferrite compositions as shown in Table 1. The Ru—$Co_2$Z ferrites were prepared by mixing appropriate amounts of $BaCO_3$, $SrCO_3$, $Co_3O_4$, $Fe_2O_3$, and $RuO_2$ were indicated in a wet planetary mill to form a mixture. The mixture was calcined to a calcination temperature of 1,200° C. for a soak time of 4 hours in air to form a ferrite. The ferrite was crushed and sieved through a 100 mesh screen. The coarse particles were sintered at 1,240° C. for 10 hours in air, ground to form particulates in a wet planetary mill, and annealed at 900° C. for 2 hours in oxygen flowing at a rate of 0.4 liters per minute to form ferrite powders. The ferrite powders had a median D50 particle size of 3 to 6 micrometers. The ferrite powders were mixed with a paraffin wax to form a composite comprising 40 volume percent of the ferrite powder and 60 volume percent of the paraffin wax. The composites were molded into toroids having an outer diameter of 7 millimeters, an inner diameter of 3 millimeters, and a wall thickness of 2.5 millimeters and the magnetic and dielectric properties were measured.

The magnetic properties are shown in Table 6 and the dielectric properties are shown in Table 7.

TABLE 6

| | Example | | | |
| --- | --- | --- | --- | --- |
| | 11 | 12 | 13 | 14 |
| y | 0 | 0.1 | 0.2 | 0.3 |
| $\mu'$ at 1 GHz | 1.62 | 1.59 | 1.50 | 1.39 |
| $\mu'$ at 1.6 GHz | 1.62 | 1.59 | 1.49 | 1.40 |
| $\mu'$ at 2 GHz | 1.63 | 1.59 | 1.49 | 1.40 |
| $\mu'$ at 3 GHz | 1.64 | 1.63 | 1.51 | 1.40 |
| $\mu'$ at 4 GHz | 1.61 | 1.64 | 1.52 | 1.42 |
| $\mu'$ at 5 GHz | 1.51 | 1.58 | 1.50 | 1.43 |
| $\tan\delta_\mu$ at 1 GHz | 0.037 | 0.044 | 0.027 | 0.002 |
| $\tan\delta_\mu$ at 1.6 GHz | 0.055 | 0.051 | 0.037 | 0.023 |
| $\tan\delta_\mu$ at 2 GHz | 0.068 | 0.056 | 0.043 | 0.027 |
| $\tan\delta_\mu$ at 3 GHz | 0.129 | 0.097 | 0.069 | 0.046 |
| $\tan\delta_\mu$ at 4 GHz | 0.227 | 0.179 | 0.123 | 0.077 |
| $\tan\delta_\mu$ at 5 GHz | 0.305 | 0.267 | 0.187 | 0.119 |

TABLE 7

| | Example | | | |
| --- | --- | --- | --- | --- |
| | 11 | 12 | 13 | 14 |
| y | 0 | 0.1 | 0.2 | 0.3 |
| $\epsilon'$ at 1 GHz | 6.45 | 6.63 | 6.42 | 6.42 |
| $\epsilon'$ at 1.6 GHz | 6.43 | 6.62 | 6.41 | 6.41 |
| $\epsilon'$ at 2 GHz | 6.42 | 6.61 | 6.41 | 6.41 |
| $\epsilon'$ at 3 GHz | 6.41 | 6.59 | 6.4 | 6.39 |
| $\epsilon'$ at 4 GHz | 6.39 | 6.57 | 6.37 | 6.37 |
| $\epsilon'$ at 5 GHz | 6.37 | 6.55 | 6.36 | 6.36 |
| $\tan\delta_\epsilon$ at 1 GHz | 0.013 | 0.013 | 0.009 | 0.009 |
| $\tan\delta_\epsilon$ at 1.6 GHz | 0.011 | 0.012 | 0.009 | 0.008 |
| $\tan\delta_\epsilon$ at 2 GHz | 0.012 | 0.013 | 0.01 | 0.009 |
| $\tan\delta_\epsilon$ at 3 GHz | 0.011 | 0.013 | 0.011 | 0.008 |
| $\tan\delta_\epsilon$ at 4 GHz | 0.012 | 0.013 | 0.109 | 0.008 |
| $\tan\delta_\epsilon$ at 5 GHz | 0.011 | 0.013 | 0.01 | 0.007 |

The results show good permeability and magnetic loss tangent values of composites comprising the ferrite particles.

Set forth below are non-limiting aspects of the present disclosure.

Aspect 1: a ferrite composition comprising a Ru—$Co_2$Z ferrite having the formula: $(Ba_{3-x}M_x)Co_2(M'Ru)_yFe_{24-2y-z}O_{41}$, wherein M is at least one of Sr, Pb, or Ca; M' is at least one of Co, Zn, Mg, or Cu; x is 1 to 3; y is greater than 0 to 2; and z is −4 to 4.

Aspect 2: The ferrite composition of aspect 1, wherein y is 0.001 to 2.

Aspect 3: The ferrite composition of any one or more of the preceding aspects, wherein M' is at least Co.

Aspect 4: The ferrite composition of any one or more of the preceding aspects, wherein a ratio of Ru to M' is 0.01 to 3.

Aspect 5: The ferrite composition of any one or more of the preceding aspects, further comprising $Bi_2O_3$ in an amount of 0.2 to 5.0 weight percent based on the total weight of the ferrite composition.

Aspect 6: The ferrite composition of any one or more of the preceding aspects, wherein the ferrite composition has a permeability of greater than or equal to 3.5 at a frequency of 1 to 2 gigahertz in the form of a solid ceramic.

Aspect 7: The ferrite composition of any one or more of the preceding aspects, wherein the ferrite composition has a permittivity of 6 to 15 at a frequency of 1 to 2 gigahertz in the form of a solid ceramic.

Aspect 8: The ferrite composition of any one or more of the preceding aspects, wherein the ferrite composition has a magnetic loss tangent tan $\delta_\mu$ of less than or equal to 0.12, or less than or equal to 0.08 at a frequency of 1 to 2 gigahertz in the form of a solid ceramic.

Aspect 9: The ferrite composition of any one or more of the preceding aspects, wherein the ferrite composition has a dielectric loss tangent tan $\delta_\epsilon$ of less than or equal to 0.01, or less than or equal to 0.008 at a frequency of 1 to 2 gigahertz in the form of a solid ceramic.

Aspect 10: An article comprising the ferrite composition of any one or more of the preceding aspects.

Aspect 11: The article of aspect 10, wherein the article is an antenna, filter, inductor, circulator, or phase shifter.

Aspect 12: The article of any one or more of Aspects 10 to 11, wherein the article is a microwave antenna.

Aspect 13: The article of any one or more of Aspects 10 to 12, wherein the article is an antenna operable at a frequency of greater than or equal to 0.1 gigahertz, or greater than or equal to 0.3 gigahertz, or 0.1 to 4 gigahertz.

Aspect 14: A method of making a ferrite composition, for example, of any one or more of the preceding aspects comprising: mixing ferrite precursor compounds comprising Fe, Ba, Co, Ru, M, and M'; and sintering the ferrite precursor compounds in an oxygen atmosphere to form the Ru—Co$_2$Z ferrite.

Aspect 15: The method of Aspect 14, wherein the ferrite precursor compounds comprise BaCO$_3$, MCO$_3$, Co$_3$O$_4$, RuO$_2$, and Fe$_2$O$_3$, wherein M is at least one of Sr, Pb, or Ca, and wherein M' is at least one of Co, Zn, Mg, or Cu.

Aspect 16: The method of Aspect 15, wherein the ferrite precursor compounds comprise 5 to 20 weight percent of BaCO$_3$, 5 to 20 weight percent of MCO$_3$, 2 to 15 weight percent of Co$_3$O$_4$, 0.1 to 10 weight percent of RuO$_2$, and 50 to 80 weight percent of Fe$_2$O$_3$; all based on the total weight of the mixture.

Aspect 17: The method of any one or more of Aspects 14 to 16, wherein the sintering occurs at a sintering temperature of 1,000 to 1,300° C., or 1,200 to 1,250° C. for a sintering time of 1 to 20 hours, or 5 to 12 hours.

Aspect 18: The method of any one or more of Aspects 14 to 16, further comprising calcining the ferrite precursor compounds in air prior to the sintering.

Aspect 19: The method of any one or more of Aspects 14 to 18, further comprising mixing the ferrite precursor compounds with a binder prior to the sintering.

Aspect 20: The method of any one or more of Aspects 14 to 19, further comprising forming the ferrite precursor compounds prior to the sintering.

Aspect 21: A composite comprising the ferrite composition of any one or more of the preceding aspects, The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

As used herein, "a," "an," "the," and "at least one" do not denote a limitation of quantity, and are intended to cover both the singular and plural, unless the context clearly indicates otherwise. For example, "an element" has the same meaning as "at least one element," unless the context clearly indicates otherwise. The term "combination" is inclusive of blends, mixtures, alloys, reaction products, and the like. Also, "at least one of" means that the list is inclusive of each element individually, as well as combinations of two or more elements of the list, and combinations of at least one element of the list with like elements not named.

The term "or" means "and/or" unless clearly indicated otherwise by context. Reference throughout the specification to "an aspect", "another aspect", "some aspects", and so forth, means that a particular element (e.g., feature, structure, step, or characteristic) described in connection with the aspect is included in at least one aspect described herein, and may or may not be present in other aspect. In addition, it is to be understood that the described elements may be combined in any suitable manner in the various aspects.

Unless specified to the contrary herein, all test standards are the most recent standard in effect as of the filing date of this application, or, if priority is claimed, the filing date of the earliest priority application in which the test standard appears.

The endpoints of all ranges directed to the same component or property are inclusive of the endpoints, are independently combinable, and include all intermediate points and ranges. For example, ranges of "up to 25 vol %, or 5 to 20 vol %" is inclusive of the endpoints and all intermediate values of the ranges of "5 to 25 vol %," such as 10 to 23 vol %, etc.

Unless defined otherwise, technical and scientific terms used herein have the same meaning as is commonly understood by one of skill in the art to which this disclosure belongs.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalent.

What is claimed is:

1. A ferrite composition comprising a Ru—Co$_2$Z ferrite having the formula:

$(Ba_{3-x}M_x)Co_2(M'Ru)_yFe_{24-2y-z}O_{41}$ wherein M is at least one of Sr, Pb, or Ca; M' is at least one of Co, Zn, Mg, or Cu; x is 1 to 3; y is greater than 0 to 2; and z is −4 to 4.

2. The ferrite composition of claim 1, wherein y is 0.1 to 2.

3. The ferrite composition of claim 1, wherein M' is at least Co.

4. The ferrite composition of claim 1, wherein a ratio of Ru to M' is 0.01 to 3.

5. The ferrite composition of claim 1, further comprising Bi$_2$O$_3$ in an amount of 0.2 to 5.0 weight percent based on the total weight of the ferrite composition.

6. The ferrite composition of claim 1, wherein the ferrite composition has a permeability of greater than or equal to 3.5 at a frequency of 1 to 2 gigahertz in the form of a solid ceramic.

7. The ferrite composition of claim 1, wherein the ferrite composition has a permittivity of 6 to 15 at a frequency of 1 to 2 gigahertz in the form of a solid ceramic.

8. The ferrite composition of claim 1, wherein the ferrite composition has a magnetic loss tangent tan δ$_μ$ of less than or equal to 0.12 at a frequency of 1 to 2 gigahertz in the form of a solid ceramic.

9. The ferrite composition of claim 1, wherein the ferrite composition has a dielectric loss tangent tan δ$_ε$ of less than or equal to 0.01 at a frequency of 1 to 2 gigahertz in the form of a solid ceramic.

10. A composite comprising a ferrite composition, and a polymer wherein the ferrite composition has the formula:

$(Ba_{3-x}M_x)Co_2(M'Ru)_yFe_{24-2y-z}O_{41}$ wherein M is at least one of Sr, Pb, or Ca; M' is at least one of Co, Zn, Mg, or Cu; x is 1 to 3; y is greater than 0 to 2; and z is −4 to 4.

11. An article comprising the ferrite composition of claim 1.

12. The article of claim 11, wherein the article is an antenna, filter, inductor, circulator, or phase shifter.

13. The article of claim 11, wherein the article is a microwave antenna.

14. The article of claim 11, wherein the article is an antenna operable at a frequency of greater than or equal to 0.1 gigahertz.

15. A method of making a ferrite composition, comprising:
mixing ferrite precursor compounds comprising Fe, Ba, Co, Ru, M, and M'; and
sintering the ferrite precursor compounds in an oxygen atmosphere to form the Ru—Co$_2$Z ferrite;
wherein the ferrite composition has the formula:

$$(Ba_{3-x}M_x)Co_2(M'Ru)_yFe_{24-2y-z}O_{41}$$

wherein M is at least one of Sr, Pb, or Ca; M' is at least one of Co, Zn, Mg, or Cu; x is 1 to 3; y is greater than 0 to 2; and z is −4 to 4.

16. The method of claim 15, wherein the ferrite precursor compounds comprise BaCO$_3$, MCO$_3$, Co$_3$O$_4$, RuO$_2$, and Fe$_2$O$_3$, wherein M is at least one of Sr, Pb, or Ca.

17. The method of claim 16, wherein the ferrite precursor compounds comprise 5 to 20 weight percent of BaCO$_3$, 5 to 20 weight percent of MCO$_3$, 2 to 15 weight percent of Co$_3$O$_4$, 0.1 to 10 weight percent of RuO$_2$, and 50 to 80 weight percent of Fe$_2$O$_3$; all based on the total weight of the mixture.

18. The method of claim 15, wherein the sintering occurs at a sintering temperature of 1,000 to 1,300° C. for a sintering time of 1 to 20 hours.

19. The method of claim 15, further comprising calcining the ferrite precursor compounds in air prior to the sintering.

20. The method of claim 15, further comprising at least one of mixing or forming the ferrite precursor compounds with a binder prior to the sintering.

* * * * *